(12) United States Patent
Trush et al.

(10) Patent No.: US 9,273,713 B2
(45) Date of Patent: Mar. 1, 2016

(54) INSULATED STUD FOR ATTACHING APPLIQUE TO METAL BODY VEHICLE AND METHODS OF MAKING AND USING THE SAME

(71) Applicant: GM Global Technology Operations LLC, Detroit, MI (US)

(72) Inventors: David M. Trush, Troy, MI (US); Lori A. Michaud, Rochester Hills, MI (US); Kenneth Calvert, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 302 days.

(21) Appl. No.: 13/673,283

(22) Filed: Nov. 9, 2012

(65) Prior Publication Data

US 2014/0130336 A1     May 15, 2014

(51) Int. Cl.
    *F16B 35/00*          (2006.01)
    *F16B 33/00*          (2006.01)
    *F16B 37/04*          (2006.01)

(52) U.S. Cl.
CPC ............. *F16B 33/008* (2013.01); *F16B 37/043* (2013.01); *F16B 37/044* (2013.01); *F16B 35/00* (2013.01); *Y10T 29/49826* (2015.01); *Y10T 29/49964* (2015.01)

(58) Field of Classification Search
CPC ...... F16B 35/00; F16B 33/008; F16B 37/043; F16B 37/044; Y10T 29/49826; Y10T 29/49964
USPC ................. 29/525.12; 40/200; 411/366.1, 378
See application file for complete search history.

(56) References Cited

U.S. PATENT DOCUMENTS

| | | | | |
|---|---|---|---|---|
| 5,966,872 | A | * | 10/1999 | Wasek et al. ..................... 49/375 |
| 6,673,469 | B2 | * | 1/2004 | Isaccsson et al. ............. 428/642 |
| 6,729,531 | B2 | * | 5/2004 | Stevenson et al. ......... 228/112.1 |
| 2012/0263557 | A1 | * | 10/2012 | Spencer et al. ............ 411/366.1 |

FOREIGN PATENT DOCUMENTS

| | | |
|---|---|---|
| CN | 103029641 A | 4/2013 |
| JP | S61114114 U | 7/1986 |
| JP | S62181455 U | 11/1987 |
| JP | S6398250 U | 6/1988 |
| JP | H0325003 U | 3/1991 |
| JP | 4615306 B2 | 1/2011 |
| KR | 101185070 B1 | 9/2012 |

OTHER PUBLICATIONS

Chinese Office Action dated May 6, 2015; Application No. 201310756246.7; Applicant:GM Global Technology Operations LLC.; 10 pages.

* cited by examiner

*Primary Examiner* — Joseph D Pape
*Assistant Examiner* — Dana Ivey
(74) *Attorney, Agent, or Firm* — BrooksGroup

(57) ABSTRACT

One variation may include a product comprising a stud assembly including a stud comprising a first metal and an insulator attached to the stud. Another variation may include a method comprising providing a stud assembly and an appliqué, wherein stud assembly comprises a stud comprising a first metal and an insulator attached to the stud, the appliqué comprising a second metal; attaching the appliqué to the stud assembly so that the insulator isolates the first metal from the second metal of the appliqué.

12 Claims, 3 Drawing Sheets

INSULATED STUD FOR ATTACHING APPLIQUE TO METAL BODY VEHICLE AND METHODS OF MAKING AND USING THE SAME

TECHNICAL FIELD

The field to which the disclosure generally relates to includes methods of attaching an appliqué to a metal body vehicle and components used therein.

BACKGROUND

Appliqués may be attached to metal body panels of vehicles.

SUMMARY OF ILLUSTRATIVE VARIATIONS OF THE INVENTION

One variation may include a product comprising a stud assembly including a stud comprising a first metal and an insulator attached to the stud.

Another variation may include a method comprising providing a stud assembly and an appliqué, wherein stud assembly comprises a stud comprising a first metal and an insulator attached to the stud, the appliquécomprising a second metal; attaching the appliqué to the stud assembly so that the insulator isolates the first metal from the second metal of the appliqué.

Other illustrative variations of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations of the invention will become more fully understood from the detailed description and the accompanying drawings, wherein.

DETAILED DESCRIPTION OF ILLUSTRATIVE VARIATIONS OF THE INVENTION

The following description of the embodiment(s) is merely illustrative in nature and is in no way intended to limit the invention, its application, or uses.

Figure 1:
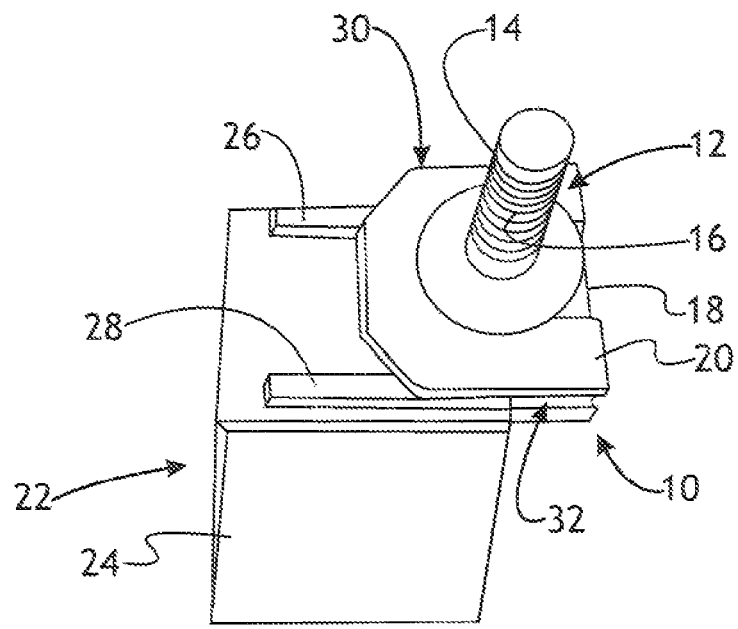
FIG. 1 is a perspective view of an assembly including an insulated stud and illustrates number of variations of the invention.

FIG. 1 illustrates a number of variations of the invention. In one variation, a stud assembly 10 may be provided and may include a stud 12 which may include a first metal. The stud 12 may include a shaft portion 14 terminating in a tip of the shaft 15. A plurality of ribs 16 or a threaded portion may be provided along the outer surface of the shaft 14. A first flange 18 may extend from the shaft 14 and may be located at a distance from the stud tip 15. An insulator 20 may be attached to the stud 12. An appliqué 22 may be provided including a second metal 24. In one variation, the appliqué 22 may include a base portion 25 that may be a polymeric, metal or composite material. In one variation, the second metal 24 may include a metal plated coating on the base portion 25.

In one variation, the stud assembly 10 including the insulator 20 may be attached to the appliqué 22 in any of a variety of ways including, but not limited to, snapping onto the appliqué 22 using friction fit locking features, being bonded to the appliqué 22 by an adhesive, or being slidably received onto the appliqué 22. In one variation, the insulator 20 may include a first groove 30 formed along one side of the insulator and a second groove 32 may be formed along a second side of the insulator. The appliqué 22 may include a first tongue 26 and a second tongue 28.

Figure 2:
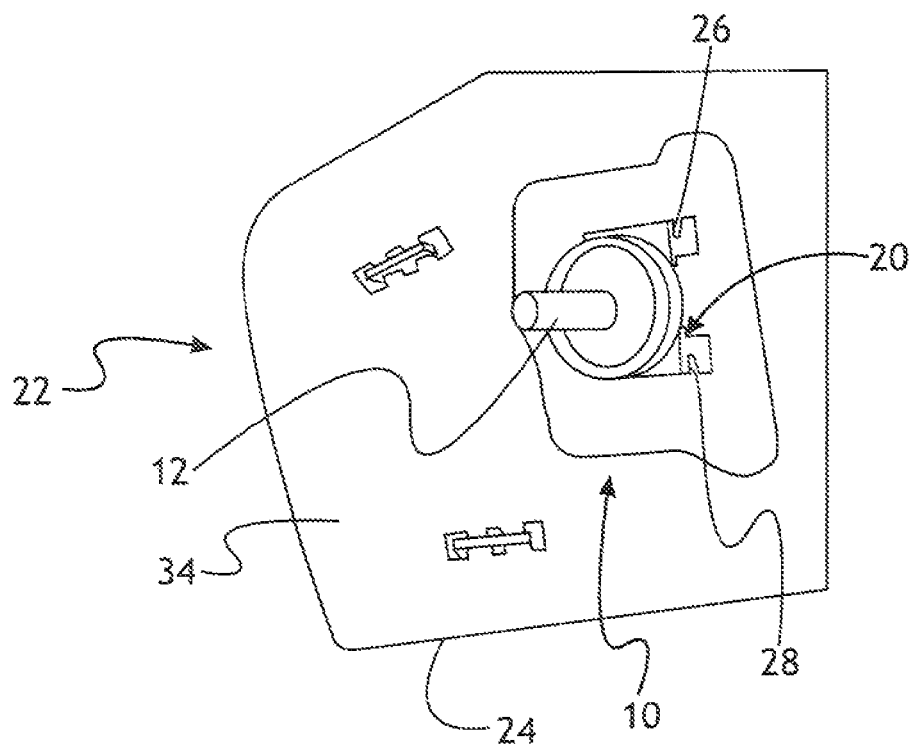
FIG. 2 is a perspective view of an assembly with portions broken away including an insulated stud and illustrates a number of variations of the invention.
Figure 3:
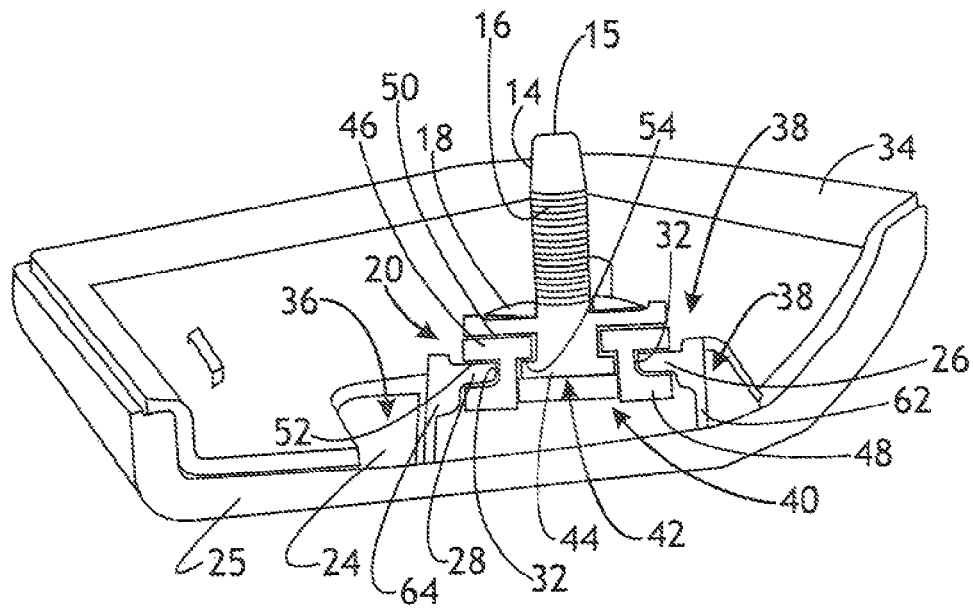
FIG. 3 is a sectional view of FIG. 2 taken along the line A-A.

FIGS. 2-3 illustrate a number of variations of the invention. In one variation, a gasket 34 may be provided covering at least a portion of an inner surface 36 of the body portion 25 of the appliqué 22. A riser 38 may extend upward from an inner surface 36 of the body portion 25 of the appliqué 22. An opening 40 may be provided in the riser 38 and may be constructed and arranged to receive a portion of the stud assembly 10. In one variation, the first tongue 26 may extend inward from a first wall 62 of the riser 38. The second tongue 28 may extend inward from a second wall 64 of the riser 38. The stud 12 may include a head portion 42 opposite the stud tip 15. In one variation, the heed portion 42 may include a second flange 44 extending from the shaft 14. In one variation, each of the first flange 18 and the second flange 44 may include an annular body portion extending from the stud shaft 14. The insulator 20 may include an upper wing 46 and a lower wing 48. The upper wing 46 may include an upper surface 50 engaging the first flange 18 of the stud 12. The upper wing 50 may include a shoulder 54 engaging the second flange 44.

Figure 4:
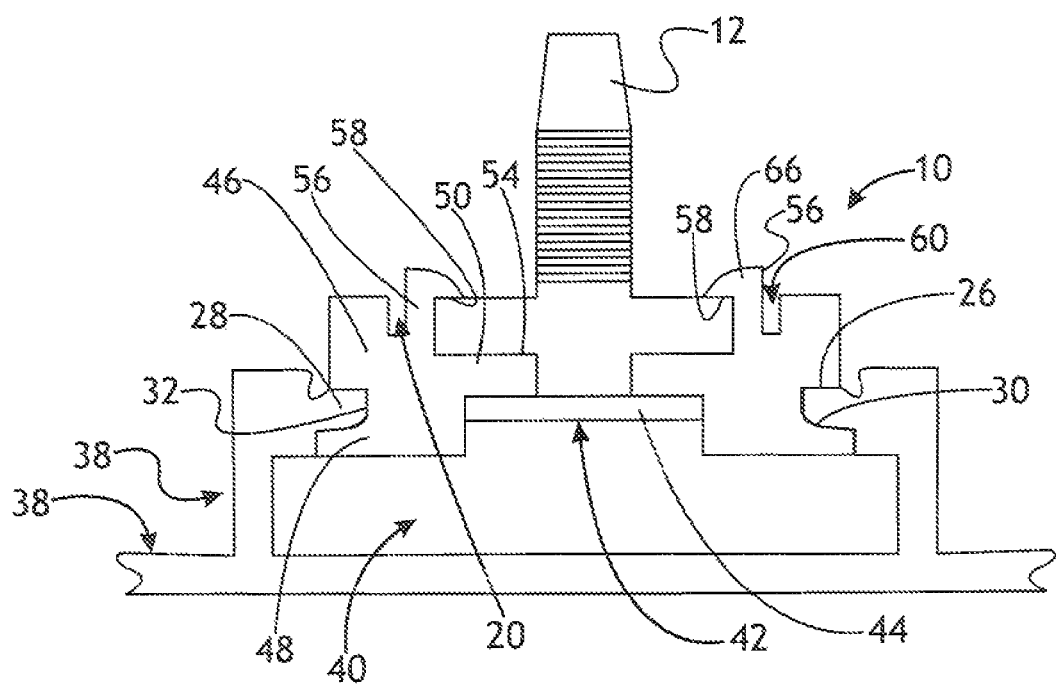
FIG. 4 is a sectional view of an assembly including an insulated stud and illustrates a number of variations of the invention.

FIG. 4 illustrates a number of variations of the invention. In one variation, the stud 12 may be snap fit into the insulator 20. The insulator 20 may include one or more flexible fingers 58 which may include a locking shoulder 58 for engaging the first flange 18 of the stud 12. A gap 60 may be provided in the insulator 22 to allow the flexible finger 56 to move outwardly as the stud 12 is snapped in place. The flexible finger 56 may include a sloped or tapered surface 66 constructed and arranged to allow the first flange 18 of the stud 12 to be slid past the same.

Figure 5:
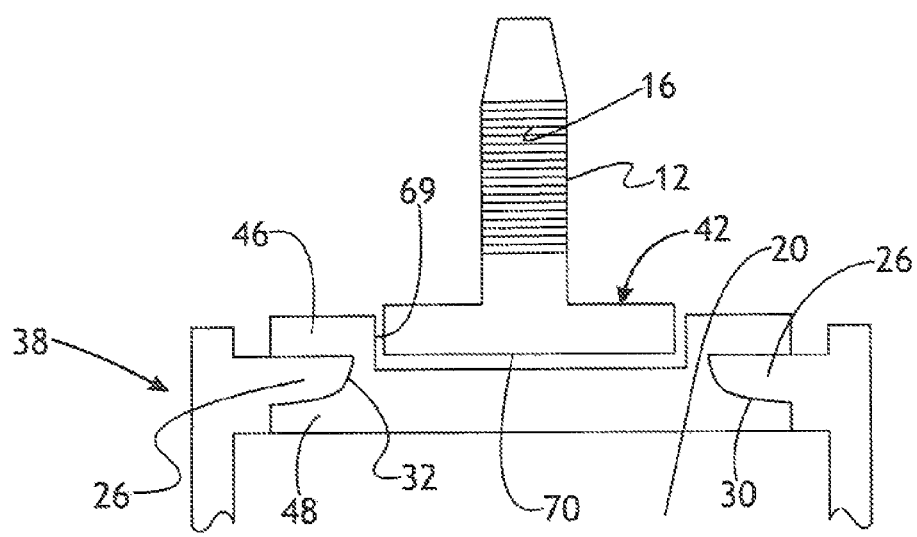
FIG. 5 is a sectional view illustrating a stud assembly including a stud bonded to an insulator by an adhesive layer according to one variation of the invention.

FIG. 5 illustrates a number of variations of the invention. In another variation, an adhesive 70 may be utilized to bond the stud 12 to the insulator 20. A pocket 69 may be provided in the insulator 20 and may be constructed and arranged to receive at least a portion of the head 42 of the stud 12.

Figure 6:
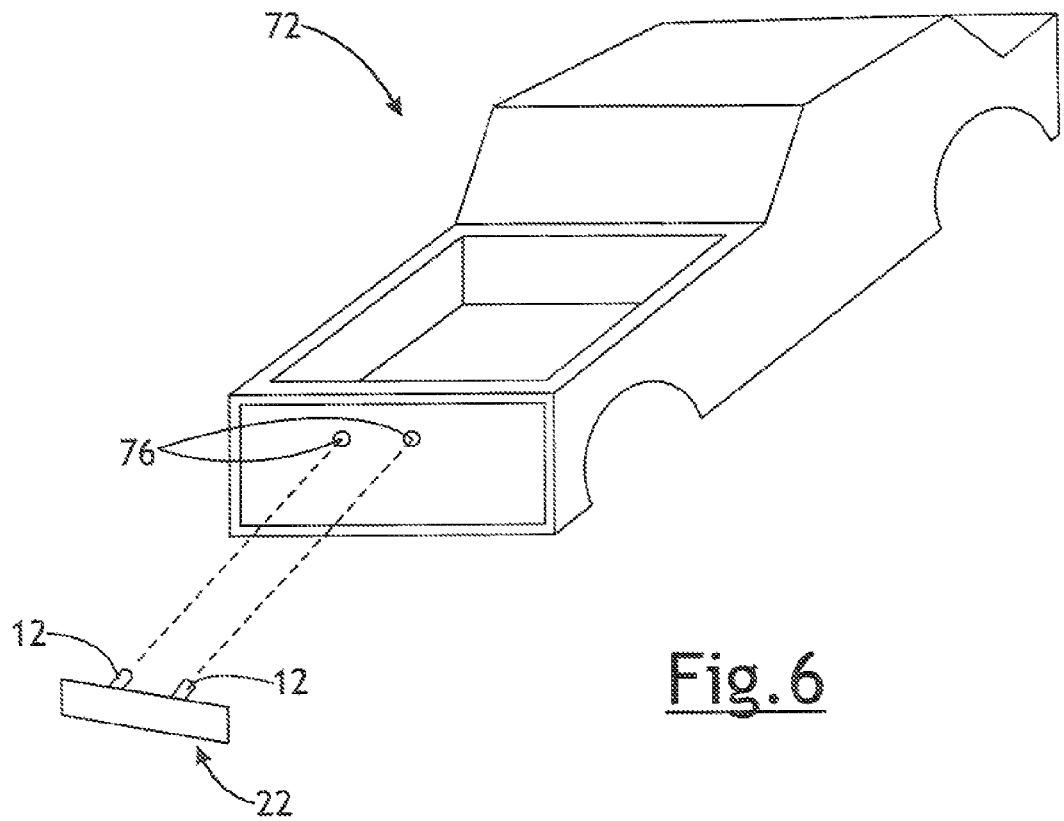
FIG. 6 is a perspective view of a metal body vehicle including an assembly including an insulated stud and an appliqué attached to the metal body vehicle and illustrates a number of variations of the invention.

FIG. 6 illustrates a number of variations of the invention. In one variation, a vehicle 72 may include a plurality of metal body panel 74 including, for example, a lift gate including a one or more holes 76 formed therein constructed and arranged to receive a portion of the stud 12 so that the appliqué 22 is attached to the metal body panel. The appliqué 22 may include, but is not limited to, a plaque, a name badge, symbol, trim molding, a handle or any other suitable component for attachment to a metal body panel 74 of the vehicle 72.

In a number of variations, the components may be arranged so that insulator 20 isolates two different metals to prevent galvanic corrosion of one or more of the first metal of the stud 12, the second metal 24 of the appliqué 22 or the metal body panel 74. In a number of variations, the insulator 20 eliminates the need for the appliqué 22 to include a resist coating thereon to galvanically isolate the first metal of the stud from the second metal of the appliqué 22. Because the resist coating is eliminated from the appliqué 22, the plating operations used for plating a metal such as chrome onto the appliqué 22 are much more cost-effective and eliminate the cost associated with the plating baths becoming contaminated by the resist coating.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other that as expressly described herein and still are considered to be within the scope of the invention.

Variation 1 may include a product comprising a stud assembly including a stud comprising a first metal and an insulator attached to the stud.

Variation 2 may include a product as set forth in variation 1 further comprising an appliqué comprising a second metal, wherein the appliqué is attached to the stud assembly and is constructed and arranged so that the insulator isolates the first metal from the second metal of the appliqué.

Variation 3 may include a product as set forth in any of variations 1-2 wherein the appliqué comprises a body portion and wherein the second metal comprises a metal plated over the body portion.

Variation 4 may include a product as set forth in any of variations 1-3 wherein the stud assembly is slidably received on the appliqué.

Variation 5 may include a product as set forth in any of variations 1-4 wherein the stud assembly is snap fit to the appliqué.

Variation 6 may include a product as set forth in any of variations 1-5 wherein the stud assembly is bonded to the appliqué by an adhesive layer.

Variation 7 may include a product as set forth in any of variations 1-6 wherein the metal plated over the body portion comprises chromium.

Variation 8 may include a product as set forth in any of variations 1-7 wherein at least one of the insulator or the appliqué includes a tongue and the other of the insulator or appliqué includes a groove constructed and arranged to receive the tongue.

Variation 9 may include a product as set forth in any of variations 1-8 wherein the stud including a shaft having a tip at one end and a head at an opposite end and a first flange extending from a shaft of the stud at a location between the tip of the shaft and the head of the shaft, and wherein the head comprises a second flange extending from the shaft, and wherein the insulator includes an upper wing having a portion interposed between the first flange and the second flange.

Variation 10 may include a product as set forth in any of variations 1-9 wherein the appliqué does not include a resist coating isolating the first metal of the stud from the second metal of the appliqué.

Variation 11 may include a product as set forth in any of variations 1-10 further comprising a metal body panel of a vehicle and wherein the appliqué is attached to the metal vehicle panel by way of the stud assembly so that the first metal of the stud is isolated from the second metal of the appliqué and the second metal of the appliqué is isolated from the metal body panel of the vehicle.

Variation 12 may include a product as set forth in any of variations 1-11 wherein the appliqué further comprises a riser extending upward from an inner surface of the appliqué, the riser including at least one wall and a tongue extending from the wall, the riser having an opening for receiving at least a portion of the insulator, and the insulator having a groove constructed and arranged to receive the tongue.

Variation 13 may include a product as set forth in any of variations 1-12 wherein the appliqué further comprises a riser extending upward from an inner surface of the appliqué, the riser including at least one wall and a flexible finger extending from the wall, the riser having an opening for receiving at least a portion of the insulator, and the flexible finger attached to the insulator so that at least a portion of the insulator is received in the opening of the riser.

Variation 14 may include a product as set forth in any of variations 1-13 wherein the appliqué is one of a plate, name badge, symbol, trim molding or handle.

Variation 15 may include a method comprising providing a stud assembly and an appliqué, wherein stud assembly comprises a stud comprising a first metal and an insulator attached to the stud, the appliquécomprising a second metal; attaching the appliqué to the stud assembly so that the insulator isolates the first metal from the second metal of the appliqué.

Variation 16 may include a method as set forth in variation 15 further comprising providing a metal body panel for a vehicle, and attaching the appliqué to the metal body panel using the stud assembly so that the insulator isolates the metal body panel from the second metal of the appliqué.

Variation 17 may include a method as set forth in any of variations 15-16 wherein the appliqué comprises a body portion and wherein the second metal comprises a metal plated over the body portion.

Variation 18 may include a product as set forth in any of variations 15-17 wherein the stud assembly is slidably received on the appliqué.

Variation 19 may include a product as set forth in any of variations 15-18 wherein the stud assembly is snap fit to the appliqué.

Variation 20 may include a product as set forth in any of variations 1-19 wherein the stud assembly is bonded to the appliqué by an adhesive layer.

Variation 21 may include a product as set forth in any of variations 15-20 wherein the metal plated over the body portion comprises chromium.

Variation 22 may include a product as set forth in any of variations 15-21 wherein at least one of the insulator or the appliqué includes a tongue and the other of the insulator or appliqué includes a groove constructed and arranged to receive the tongue.

Variation 23 may include a product as set forth in any of variations 15-22 wherein the stud including a shaft having a tip at one end and a head at an opposite end and a first flange extending from a shaft of the stud at a location between the tip of the shaft and the head of the shaft, and wherein the head comprises a second flange extending from the shaft, and wherein the insulator includes an upper wing having a portion interposed between the first flange and the second flange.

Variation 24 may include a product as set forth in any of variations 15-23 wherein the appliqué does not include a resist coating isolating the first metal of the stud from the second metal of the appliqué.

Variation 25 may include a product as set forth in any of variations 15-24 further comprising a metal body panel of a vehicle and wherein the appliqué is attached to the metal vehicle panel by way of the stud assembly so that the first metal of the stud is isolated from the second metal of the appliqué and the second metal of the appliqué is isolated from the metal body panel of the vehicle.

Variation 26 may include a product as set forth in any of variations 15-25 wherein the appliqué further comprises a riser extending upward from an inner surface of the appliqué, the riser including at least one wall and a tongue extending from the wall, the riser having an opening for receiving at least a portion of the insulator, and the insulator having a groove constructed and arranged to receive the tongue.

Variation 27 may include a product as set forth in any of variations 15-26 wherein the appliqué further comprises a riser extending upward from an inner surface of the appliqué, the riser including at least one wall and a flexible finger extending from the wall, the riser having an opening for receiving at least a portion of the insulator, and the flexible finger attached to the insulator so that at least a portion of the insulator is received in the opening of the riser.

Variation 28 may include a product as set forth in any of variations 15-26 wherein the appliqué is one of a plate, name badge, symbol, trim molding or handle.

Variation 29 may include a method as set forth in variations 15-28 wherein at least one of the insulator or the appliqué includes a tongue and the other of the insulator or appliqué includes a groove constructed and arranged to receive the tongue.

The above description of select examples of variations of the invention is merely illustrative in nature and, thus, variations or variants thereof are not to be regarded as a departure from the spirit and scope of the invention.

What is claimed is:

1. A product comprising a stud assembly including a stud comprising a first metal and an insulator attached to the stud and an appliqué comprising a second metal, wherein the appliqué is attached to the stud assembly and is constructed and arranged so that the insulator isolates the first metal from the second metal of the appliqué and wherein the stud including a shaft having a tip at one end and a head at an opposite end and a first flange extending from a shaft of the stud at a location between the tip of the shaft and the head of the shaft, and wherein the head comprises a second flange extending from the shaft, and wherein the insulator includes an upper wing having a portion interposed between the first flange and the second flange.

2. A product as set forth in claim 1 wherein the appliqué comprises a body portion and wherein the second metal comprises a metal plated over the body portion.

3. A product as set forth in claim 2 wherein the metal plated over the body portion comprises chromium.

4. A product as set forth in claim 1 wherein the stud assembly is slidably received on the appliqué.

5. A product as set forth in claim 1 wherein the stud assembly is snap fit to the appliqué.

6. A product as set forth in claim 1 wherein the stud assembly is bonded to the appliqué by an adhesive layer.

7. A product as set forth in claim 1 wherein at least one of the insulator or the appliqué includes a tongue and at least one of the insulator or appliqué includes a groove constructed and arranged to receive the tongue.

8. A product as set forth in claim 1 wherein the appliqué does not include a resist coating isolating the first metal of the stud from the second metal of the appliqué.

9. A product as set forth in claim 1 further comprising a metal body panel of a vehicle and wherein the appliqué is attached to the metal vehicle panel by way of the stud assembly so that the first metal of the stud is isolated from the second metal of the appliqué and the second metal of the appliqué is isolated from the metal body panel of the vehicle.

10. A product as set forth in claim 1 wherein the appliqué further comprises a riser extending upward from an inner surface of the appliqué, the riser including at least one wall and a tongue extending from the wall, the riser having an opening for receiving at least a portion of the insulator, and the insulator having a groove constructed and arranged to receive the tongue.

11. A product as set forth in claim 1 wherein the appliqué further comprises a riser extending upward from an inner surface of the appliqué, the riser including at least one wall and a flexible finger extending from the wall, the riser having an opening for receiving at least a portion of the insulator, and the flexible finger attached to the insulator so that at least a portion of the insulator is received in the opening of the riser.

12. A product as set forth in claim 1 wherein the appliqué is one of a plate, name badge, symbol, trim molding or handle.

* * * * *